United States Patent
Wang

(10) Patent No.: US 12,213,853 B2
(45) Date of Patent: Feb. 4, 2025

(54) TOOTH WHITENING SYSTEM

(71) Applicant: KONINKLIJKE PHILIPS N.V., Eindhoven (NL)

(72) Inventor: Tianyi Wang, Kenmore, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 393 days.

(21) Appl. No.: 17/771,239

(22) PCT Filed: Oct. 20, 2020

(86) PCT No.: PCT/EP2020/079412
§ 371 (c)(1),
(2) Date: Apr. 22, 2022

(87) PCT Pub. No.: WO2021/078696
PCT Pub. Date: Apr. 29, 2021

(65) Prior Publication Data
US 2023/0000604 A1 Jan. 5, 2023

Related U.S. Application Data

(60) Provisional application No. 62/924,203, filed on Oct. 22, 2019.

(51) Int. Cl.
*A61C 19/06* (2006.01)
*H05B 45/22* (2020.01)
*H05B 47/105* (2020.01)

(52) U.S. Cl.
CPC .......... *A61C 19/066* (2013.01); *H05B 45/22* (2020.01); *H05B 47/105* (2020.01)

(58) Field of Classification Search
CPC .............. A61C 19/066; A61C 19/003; A61C 19/004; H05B 45/22; H05B 47/105
USPC .......................................................... 433/29
See application file for complete search history.

(56) References Cited

U.S. PATENT DOCUMENTS

| | | | | |
|---|---|---|---|---|
| 5,456,603 A | * | 10/1995 | Kowalyk | A61C 1/0046 433/29 |
| 9,492,257 B2 | | 11/2016 | Jablow et al. | |
| 10,588,829 B2 | * | 3/2020 | Baeten | A61K 6/887 |
| 10,667,893 B2 | * | 6/2020 | Sagel | A61Q 11/00 |
| 11,284,981 B2 | * | 3/2022 | Young | A61C 5/90 |

(Continued)

OTHER PUBLICATIONS

International Search Report and Written Opinion Dated Nov. 26, 2020 For International Application No. PCT/EP2020/079412 Filed Oct. 20, 2020.

*Primary Examiner* — Matthew M Nelson

(57) ABSTRACT

The present invention relates to a tooth whitening system (10), comprising a light source (30), a light detector (40), and a processing unit (50). The light source is configured such that a wavelength of the light emitted is adjustable over a wavelength range of operation. The detector is configured to detect light emitted from the light source. The processing unit is configured to control the light source to adjust the wavelength of the light emitted by the light source and determine a measure of absorption light detected that was emitted from the light source as the wavelength is adjusted. The processing unit is configured to utilize the determined measure of absorption to operate the light source at a wavelength at a peak in absorption.

16 Claims, 9 Drawing Sheets

(56) References Cited

U.S. PATENT DOCUMENTS

| | | | |
|---|---|---|---|
| 2004/0010299 A1* | 1/2004 | Tolkoff | A61N 5/0624 |
| | | | 607/88 |
| 2004/0191729 A1 | 9/2004 | Altshuler et al. | |
| 2004/0193235 A1* | 9/2004 | Altshuler | A61N 5/0603 |
| | | | 607/88 |
| 2007/0086960 A1* | 4/2007 | Tarver | A61K 8/466 |
| | | | 424/49 |
| 2010/0015576 A1* | 1/2010 | Altshuler | A61B 5/0088 |
| | | | 433/226 |
| 2010/0279248 A1* | 11/2010 | Mourad | A61B 5/7275 |
| | | | 433/29 |
| 2015/0305627 A1* | 10/2015 | Islam | G01N 21/35 |
| | | | 433/29 |
| 2015/0328120 A1* | 11/2015 | Hao | A61K 8/60 |
| | | | 424/53 |
| 2016/0030323 A1* | 2/2016 | Brody | A61P 1/02 |
| | | | 424/54 |
| 2018/0133502 A1* | 5/2018 | Rajaiah | A61K 8/92 |
| 2018/0140198 A1* | 5/2018 | Islam | G01N 33/15 |
| 2021/0244965 A1* | 8/2021 | Nikinmaa | A61N 5/062 |
| 2023/0000604 A1* | 1/2023 | Wang | A61C 19/066 |

\* cited by examiner

TOOTH WHITENING SYSTEM

This application is the U.S. National Phase application under 35 U.S.C. § 371 of International Application No. PCT/EP2020/079412, filed on Oct. 20, 2020, which claims the benefit of U.S. application No. 62/924,203, filed Oct. 22, 2019. These applications are hereby incorporated by reference herein.

FIELD OF THE INVENTION

The present invention relates to tooth whitening systems, a method of controlling a tooth whitening system, as well as to a computer program element and a computer readable medium.

BACKGROUND OF THE INVENTION

Blue light absorbed by staining molecules inside the teeth can be used in conjunction with hydrogen peroxide ($H_2O_2$) to facilitate teeth whitening.

The color of the tooth arises principally from staining molecules which become accumulated throughout the tooth structure throughout life. Typically, the stains are classified to be intrinsic, extrinsic or internalised as shown in the table below

| Pigment Type | Origin | Piment Color | Molecular Structure |
|---|---|---|---|
| Porphyrins (blood pigment) | Tooth trauma, sickle cell anemia, erythroblastosis fetalis, etc. | E.g., heme (red) | 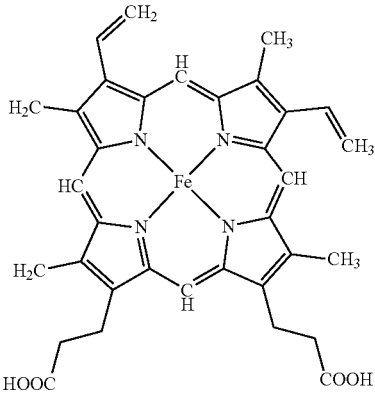 Heme |
| Mercury (Amalgam tattoo) | Amalgam fillings | Grey/silver | |
| Tannins | Coffee, tea | E.g., tannic acid (yellow/ light brown) | 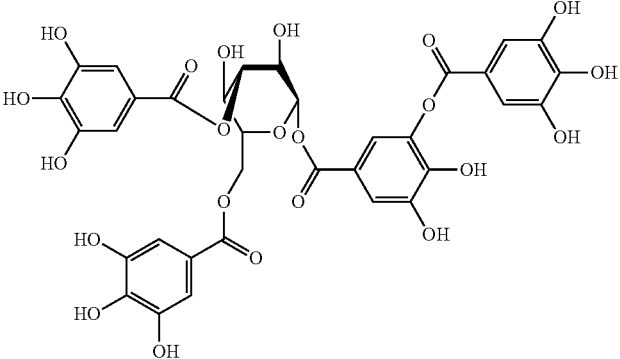 E.g., tannic acid |
| Fluoride Stains | Excess fluoride during tooth development (dental fluorosis) | White/brown staining | 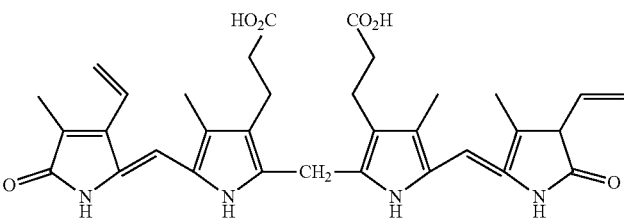 |

| Pigment Type | Origin | Piment Color | Molecular Structure |
|---|---|---|---|
| Bilirubin | Jaundice | Yellow | 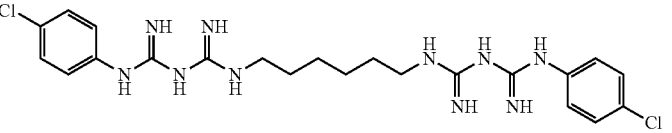 [SMILES: N=C(NCCCCCCNC(=N)NC(=N)Nc1ccc(Cl)cc1)NC(=N)Nc1ccc(Cl)cc1] |
| Bacterial pigments | Plaque | E.g., actinomyces (yellow) | |
| Chlorhexidine stains | Mouthwashes | Brown staining | |
| Carotene (yellow) | Food | Orange | 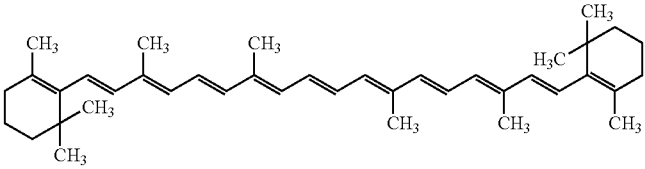 [SMILES: CC1=C(/C=C/C(C)=C/C=C/C(C)=C/C=C/C=C(C)/C=C/C=C(C)/C=C/C2=C(C)CCCC2(C)C)C(C)(C)CCC1] |

Blue light absorbed by staining molecules inside the teeth improves the whitening results by facilitating the reaction between hydrogen peroxide ($H_2O_2$) and the staining molecules. Systems for tooth whitening have a mouthpiece, also termed a body, that sits around the teeth where homogenous illumination at a wavelength (~460 nm) and irradiance (25-100 mW/cm$^2$) is directed onto the teeth, via direct illumination using LED arrays or waveguide illumination.

Although blue light (400-495 nm) can be absorbed by staining molecules inside the teeth and improves the whitening results by facilitating the reaction between hydrogen peroxide ($H_2O_2$) and staining molecules, it has been found that different users have different stain profiles for their teeth, and the tooth whitening results can be inconsistent and non-optimised.

There is a need to address these issues.

SUMMARY OF THE INVENTION

It would be advantageous to have improved means of teeth whitening. The object of the present invention is solved with the subject matter of the independent claims, wherein further embodiments are incorporated in the dependent claims. It should be noted that the following described aspects and examples of the invention apply also to the tooth whitening systems, the method of controlling a tooth whitening system, as well as to the computer program element and a computer readable medium.

In a first aspect, there is provided tooth whitening system, comprising:
 a light source;
 a light detector; and
 a processing unit.

The light source is configured such that a wavelength of the light emitted is adjustable over a wavelength range of operation. The detector is configured to detect light emitted from the light source. The processing unit is configured to control the light source to adjust the wavelength of the light emitted by the light source and is configured to determine a measure of absorption for different wavelengths on the basis of the detected light for the different wavelengths. The processing unit is configured to utilize the determined measure of absorption to operate the light source at a wavelength at a peak in absorption.

In other words, an adjustable incident light wavelength on the teeth is provided for higher whitening efficacy and consistency based on the feedback of the type of staining molecules inside the teeth.

To put this another way, the processing unit is configured to control the light source to scan the wavelength of the light emitted over the wavelength range, and determine associated measures of absorption as the wavelength of the light emitted by the light source is scanned over the wavelength range, and then operate in a tooth whitening mode at the wavelength at the peak in absorption on the basis of the measures of absorption.

In this manner, a tooth whitening system that uses light along with for example hydrogen peroxide can automatically operate at the correct wavelength for the stains that are present for a particular user, without having to know at what wavelength the system is operating. Also, once used and teeth have been whitened with respect to a specific stain further utilization of the system will automatically target the next most prevalent stain.

Thus, the system can scan the wavelength of light emitted by the light source without knowing what that wavelength is, and then operate at the scan position associated with the peak in absorption to automatically target the most prevalent stain present.

In an example, the processing unit is configured to control the light source to adjust the wavelength of the light emitted by the light source over the wavelength range of operation of at least 400-495 nm.

In this manner, key teeth stains such as carotene, Tannins (coffee, tea), porphyrins, and fluoride stains can be targeted.

In an example, the system comprises further at least one light source. The processing unit is configured to operate the further at least one light source at the wavelength at the peak in absorption on the basis of the measures of absorption.

In other words, the system can scan the wavelength of light emitted by a first source without knowing what that wavelength is, and then operate the first light source at the scan position associated with the peak in absorption to automatically target the most prevalent stain present with that light source. However, that information can be used to operate further light sources at the same wavelength, again without knowing the wavelength. For example, the light sources can all be the same type and when driven in a particular manner are known to emit the same wavelength. Thus, the other light sources need only match their operational characteristics to the first light source to then operate at the same wavelength as the first light source and target the most prevalent stain present for a person's teeth. Thus, the further light source or sources could be placed at different places around the body to target different teeth to that targeted by the first light source. One of the further light sources could also be placed adjacent to the first light source to provide a simple manner of determining a peak in absorption with one light source, and then operating at a higher power through operation of more than one light source at that position. There could clearly be more than one light source at each position around the body to target specific teeth with a higher power available from one light source alone.

In an example, the processing unit is configured to operate at a wavelength scan position associated with a maximum in determined measure of absorption.

In an example, the processing unit is configured to operate at the wavelength at the peak in absorption comprising a comparison of the measures of absorption for the different wavelengths of the light emitted by the light source with one or more known absorption profiles of stain molecules.

In other words, the absorption profile determined can be compared against known absorption spectra for different molecules to determine the stain type or combination of stain type (if multiple stains then percentages of stain types) facilitating the system to operate at the optimum wavelength.

In an example, the light source is configured to operate over a range of light emission power. The processing unit is configured to control the light source to operate at an operational light power on the basis of the determined measure of absorption.

Thus, the power of emitted light can be optimised in order to provide for effective tooth whitening.

In an example, the processing unit is configured to control the light source to operate at the operational light power such that an intensity of light absorbed equals a required absorption intensity.

In an example, the light source and detector are housed in a body such that when the body is placed adjacent to at least one of the user's teeth the source and detector are on opposites sides of the at least one of the users' teeth.

In an example, the light source and detector are housed in a body such that when the body is placed adjacent to at least one of the user's teeth the source and detector are on the same side of the at least one of the users' teeth.

In a second aspect, there is provided a tooth whitening system, comprising:
 a plurality of light sources;
 a plurality of light detectors; and
 a processing unit.

Each light source is paired with a detector. Each light source is configured such that a wavelength of the light emitted is adjustable over a wavelength range of operation. Each detector is configured to detect light emitted from the paired light source. For each light source and detector pair the processing unit is configured to control each light source to adjust the wavelength of the light emitted by the light source and determine a measure of absorption for different wavelengths on the basis of the detected light for the different wavelengths. For each light source and detector pair the processing unit is configured to utilize the determined measure of absorption to operate the light source of each light source and detector pair at a wavelength at a peak in absorption.

In this manner, different teeth that have different stains can be treated in a bespoke fashion to ensure that all the teeth are whitened effectively.

To put this another way, the processing unit is configured to control the light source of a light source and detector pair to scan the wavelength of the light emitted over the wavelength range, and wherein the processing unit is configured to determine associated measures of absorption as the wavelength of the light emitted by the light source is scanned over the wavelength range, and wherein the processing unit is configured to operate in a tooth whitening mode for that light source and detector pair at the wavelength at the peak in absorption on the basis of the measures of absorption as the wavelength of the light emitted by the light source is scanned over the wavelength range. Therefore, the light source(s) for teeth whitening is operated at the optimal wavelength.

In an example, the processing unit is configured to control each light source to operate at a wavelength independent of the operational wavelength of any of the other light sources.

In a third aspect, there is provided a method of controlling a tooth whitening system. The tooth whitening system comprises a light source, a light detector, and a processing unit. The light source is configured such that a wavelength of the light emitted is adjustable over a wavelength range of operation. The detector is configured to detect light emitted from the light source. The method comprises:
 a) controlling by the processing unit the light source to adjust the wavelength of the light emitted by the light source;
 b) determining by the processing unit a measure of absorption for different wavelengths on the basis of the detected light for the different wavelengths; and
 c) utilizing by the processing unit the determined measure of absorption to operate the light source at a wavelength at a peak in absorption.

In an example, the system comprises further at least one light source, and the method comprises controlling by the processing unit the further at least one light source to operate at the wavelength at the peak in absorption on the basis of the measures of absorption.

In an example, the method comprises operating by the processing unit at a wavelength scan position associated with a maximum in determined measure of absorption.

According to another aspect, there is provided a computer program element controlling one or more of the systems as previously described which, if the computer program element is executed by a processing unit, is adapted to perform one or more of the methods as previously described.

According to another aspect, there is provided a computer readable medium having stored computer element as previously described.

The computer program element can for example be a software program but can also be a FPGA, a PLD or any other appropriate digital means.

In an example, the computer program element is controllable by a smartphone application, which optionally can display the progress (e.g. teeth shade change) per treatment.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
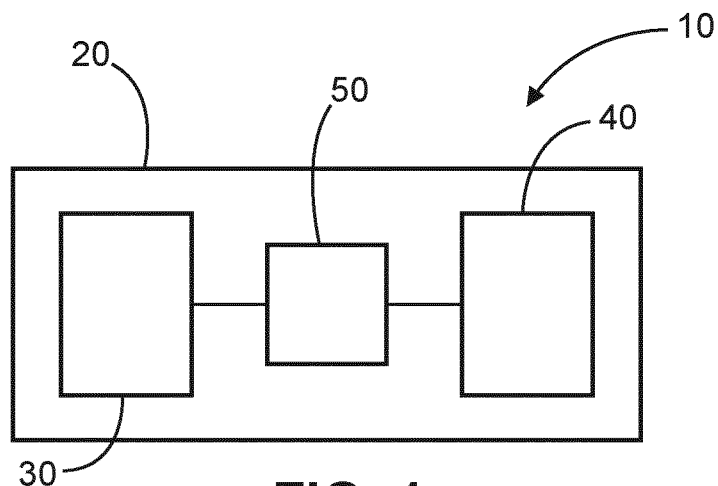
FIG. 1 shows a schematic set up of an example of a tooth whitening system.

FIG. 1 shows a tooth whitening system 10 comprising a light source 30, a light detector 40, and a processing unit 50. The light source is configured such that a wavelength of the light emitted is adjustable over a wavelength range of operation. The detector is configured to detect light emitted from the light source. The processing unit is configured to control the light source to adjust the wavelength of the light emitted by the light source to a number of different wavelengths and determine a measure of absorption for the different wavelengths on the basis of the detected light for the different wavelengths. The processing unit is configured to utilize the determined measure of absorption to operate the light source at a wavelength at a peak in absorption.

The light source and detector can housed in a body, and the body can be configured to be placed adjacent to at least one of a user's teeth.

Thus, the light source can be configured to emit light that can be transmitted and/or reflected and/or scattered from the at least one of the user's teeth.

Thus, the detector can be configured to detect light emitted from the light source that is transmitted and/or reflected and/or scattered from the at least one of the user's teeth.

Thus, the processing unit can be configured to control the light source to adjust the wavelength of the light emitted by the light source and determine a measure of absorption of the at least one of the users teeth for different wavelengths on the basis of the detected light that was emitted from the light source and transmitted and/or reflected and/or scattered from the at least one of the user's teeth as the wavelength was adjusted for the different wavelengths.

The processing unit can then utilize the determined measure of absorption to operate the light source in a tooth whitening mode at a wavelength at a peak in absorption for the at least one of the user's teeth.

In an example, the light source and detector are housed in a body with a fixed and known distance between light source and detector.

In an example, the light source(s) is/are a tuneable laser.

In an example, the light source(s) is/are a tuneable LED.

In an example, a tunable bandpass filter is associated with a light source to vary the wavelength.

In an example, the light source(s) has a bandwidth of less than 5 nm.

In an example, the light source(s) has a bandwidth of 5 nm.

In an example, the light source(s) has a bandwidth of 10 nm.

In an example, the light source(s) has a bandwidth of 15 nm.

In an example, the light source(s) has a bandwidth of 20 nm.

In an example, the light source(s) has a bandwidth of 30 nm.

According to an example, the processing unit is configured to control the light source to adjust the wavelength of the light emitted by the light source over the wavelength range of operation of at least 400-495 nm.

According to an example, the system comprises further at least one light source. The processing unit is configured to operate the further at least one light source at the wavelength at the peak in absorption on the basis of the measures of absorption.

Thus, the processing unit can operate the further at least one light source in a tooth whitening mode at the wavelength at the peak in absorption on the basis of the measures of absorption.

According to an example, the processing unit is configured to operate in the tooth whitening mode at a wavelength scan position associated with a maximum in determined measure of absorption.

Thus, the processing unit can operate in a tooth whitening mode at a scan position associated with a maximum in determined measure of absorption.

According to an example, the processing unit is configured to operate at the wavelength at the peak in absorption comprising a comparison of the measures of absorption as the wavelength of the light emitted by the light source is scanned over the wavelength range with one or more known absorption profiles of stain molecules.

Thus, the processing unit can operate in a tooth whitening mode at the wavelength at the peak in absorption by comparing the measures of absorption as the wavelength of the light emitted by the light source is scanned over the wavelength range with one or more known absorption profiles of stain molecules for teeth.

According to an example, the light source is configured to operate over a range of light emission power. The processing unit is configured to control the light source to operate at an operational light power on the basis of the determined measure of absorption.

Therefore, the processing unit can control the light source to operate in a tooth whitening mode at an operational light power on the basis of the determined measure of absorption.

According to an example, the processing unit is configured to control the light source to operate at the operational light power such that an intensity of light absorbed equals a required absorption intensity.

Thus, the processing unit can control the light source to operate at an operational light power such that an intensity of light absorbed by the at least one of the user's teeth equals a required absorption intensity.

In an example, the required absorption intensity is determined utilizing a calibration tooth.

According to an example, the light source and detector are housed in a body such that when the body is placed adjacent to the at least one of the user's teeth the source and detector are on opposites sides of the at least one of the users' teeth.

According to an example, the light source and detector are housed in a body such that when the body is placed adjacent to the at least one of the user's teeth the source and detector are on the same side of the at least one of the users' teeth.

Figure 2:
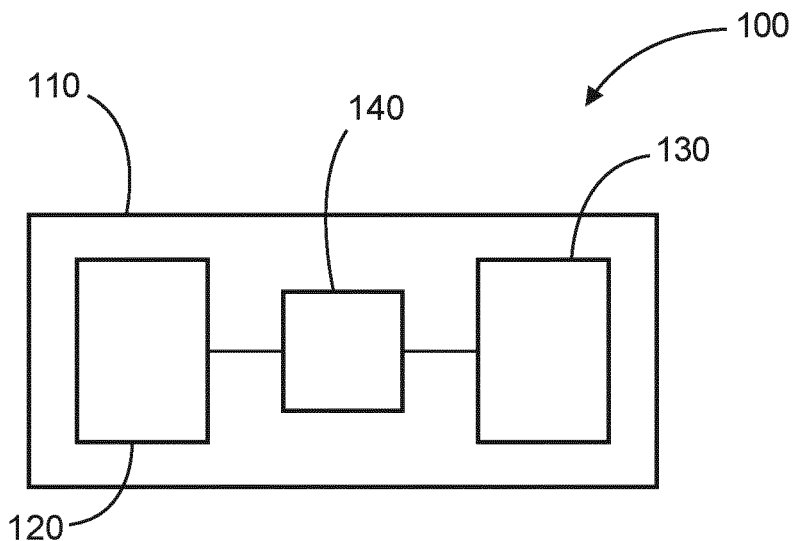
FIG. 2 shows a schematic set up of an example of a tooth whitening system.

FIG. 2 shows an example of a tooth whitening system 100 comprising a plurality of light sources 120, a plurality of light detectors 130, and a processing unit 140. Each light source is paired with a detector. Each light source is configured such that a wavelength of the light emitted is adjustable over a wavelength range of operation. Each detector is configured to detect light emitted from the paired light source. For each light source and detector pair the processing unit is configured to control each light source to adjust the wavelength of the light emitted by the light source to a number of different wavelengths and is configured to determine a measure of absorption on the basis of the detected light for the different wavelengths. For each light source and detector pair the processing unit is configured to utilize the determined measure of absorption to operate the light source of each light source and detector pair at a wavelength at a peak in absorption.

The plurality of light sources and the plurality of detectors can be housed in a body 110 that is configured to be placed adjacent to a plurality of the user's teeth.

Each light source can be used to emit light that can be transmitted and/or reflected and/or scattered from at least one of the user's teeth.

Each detector can thus be used to detect light emitted from the paired light source that is transmitted and/or reflected and/or scattered from the at least one of the user's teeth.

Thus, for each light source and detector pair the processing unit can be used to control each light source to adjust the wavelength of the light emitted by the light source and determine a measure of absorption of one or more of the plurality of the users teeth for different wavelengths on the basis of the detected light that was emitted from the light source and transmitted and/or reflected and/or scattered from the one or more of the plurality of the user's teeth as the wavelength is adjusted for the different wavelengths.

Thus, for each light source and detector pair the processing unit can utilize the determined measure of absorption to operate the light source of each light source and detector pair in a tooth whitening mode at a wavelength at a peak in absorption for the one or more of the plurality of the user's teeth.

According to an example, the processing unit is configured to control each light source to operate at a wavelength independent of the operational wavelength of any of the other light sources.

Thus, the processing unit can control each light source to operate in a tooth whitening mode at a wavelength independent of the operational wavelength of any of the other light sources.

In an example, the processing unit is configured to control each light source to adjust the wavelength of the light emitted by the light source over the wavelength range of operation of at least 400-495 nm.

In an example, the processing unit is configured to operate at a scan position associated with a maximum in determined measure of absorption.

Thus, the processing unit can operate in a tooth whitening mode at a scan position associated with a maximum in determined measure of absorption.

In an example, the processing unit is configured to operate at the wavelength at the peak in absorption comprising a comparison of the measures of absorption as the wavelength of the light emitted by the light source is scanned over the wavelength range with one or more known absorption profiles of stain molecules.

Thus, the processing unit can operate in a tooth whitening mode at the wavelength at the peak in absorption by comparing the measures of absorption as the wavelength of the light emitted by the light source is scanned over the wavelength range with one or more known absorption profiles of stain molecules.

In an example, the light source of each detector and light source pair is configured to operate over a range of light emission power, and wherein the processing unit is configured to control the light source to operate at an operational light power on the basis of the determined measure of absorption.

Thus, the processing unit can control the light source to operate in a tooth whitening mode at an operational light power on the basis of the determined measure of absorption.

In an example, the operational light power is determined comprising utilization of a calibration tooth.

In an example, the processing unit is configured to control the light source to operate at the operational light power such that an intensity of light absorbed equals a calibrated absorption intensity.

Thus, the processing unit can control the light source to operate at an operational light power such that an intensity of light absorbed by the at least one of the user's teeth equals a calibrated absorption intensity.

In an example, each the light source and detector are housed in a body such that when the body is placed adjacent to the at least one of the user's teeth each light source and detector are on opposites sides of the at least one of the users' teeth.

In an example, each light source and detector are housed in a body such that when the body is placed adjacent to the at least one of the user's teeth the source and detector are on the same side of the at least one of the users' teeth.

Figure 3:
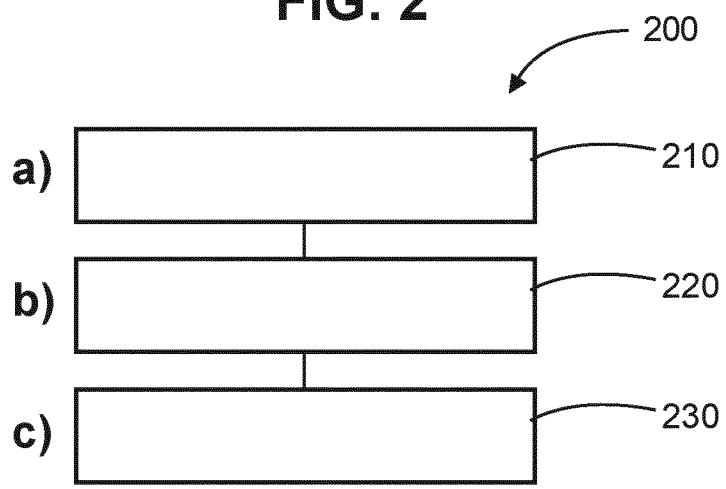
FIG. 3 shows a method of controlling a tooth whitening system.

FIG. 3 shows a method 200 of controlling a tooth whitening system. The tooth whitening system comprises a light source, a light detector, and a processing unit. The light source is configured such that a wavelength of the light emitted is adjustable over a wavelength range of operation. The detector is configured to detect light emitted from the light source. The method 200 comprises:

in a controlling step 210, also referred to as step a), controlling by the processing unit the light source to adjust the wavelength of the light emitted by the light source to a number of different wavelengths;

in a determining step 220, also referred to as step b), determining by the processing unit a measure of absorption for the different wavelengths on the basis of the detected light for the different wavelengths; and in a utilizing step 230, also referred to as step c), utilizing by the processing unit the determined measure of absorption to operate the light source at a wavelength at a peak in absorption.

The light source and detector can be housed in a body, and the body can be configured to be placed adjacent to at least one of a user's teeth.

Thus, the light source can be configured to emit light that can be transmitted and/or reflected and/or scattered from the at least one of the user's teeth.

Thus, the detector can be configured to detect light emitted from the light source that is transmitted and/or reflected and/or scattered from the at least one of the user's teeth.

Thus, the processing unit can be configured to control the light source to adjust the wavelength of the light emitted by the light source and determine a measure of absorption of the at least one of the users teeth for different wavelengths on the basis of the detected light that was emitted from the light source and transmitted and/or reflected and/or scattered from the at least one of the user's teeth as the wavelength was adjusted for the different wavelengths.

The processing unit can then utilize the determined measure of absorption to operate the light source in a tooth whitening mode at a wavelength at a peak in absorption for the at least one of the user's teeth.

In an example, the processing unit is configured to control the light source to adjust the wavelength of the light emitted by the light source over the wavelength range of operation of at least 400-495 nm.

According to an example, the system comprises further at least one light source, and the method comprises controlling by the processing unit the further at least one light source to operate at the wavelength at the peak in absorption on the basis of the measures of absorption.

Thus, in the method the processing unit can control the further at least one light source to operate in a tooth whitening mode at the wavelength at the peak in absorption on the basis of the measures of absorption.

According to an example, step c) comprises operating by the processing unit at a scan position associated with a maximum in determined measure of absorption.

Thus, in the method the processing unit can operate in a tooth whitening mode at a scan position associated with a maximum in determined measure of absorption.

In an example, wherein operating by the processing unit at the wavelength at the peak in absorption comprises comparing the measures of absorption as the wavelength of the light emitted by the light source is scanned over the wavelength range with one or more known absorption profiles of stain molecules.

Thus, the processing unit can operate in a tooth whitening mode at the wavelength at the peak in absorption by comparing the measures of absorption as the wavelength of the light emitted by the light source is scanned over the wavelength range with one or more known absorption profiles of stain molecules for teeth.

In an example, the light source is configured to operate over a range of light emission power, and wherein the method comprises controlling by the processing unit the light source to operate at an operational light power on the basis of the determined measure of absorption.

Therefore, the processing unit can control the light source to operate in a tooth whitening mode at an operational light power on the basis of the determined measure of absorption.

In an example, the method comprises controlling by the processing unit the light source to operate at the operational light power such that an intensity of light absorbed equals a calibrated absorption intensity.

Thus, the processing unit can control the light source to operate at an operational light power such that an intensity of light absorbed by at least one of the user's teeth equals a required absorption intensity.

In an example, the light source and detector are housed in a body such that when the body is placed adjacent to the at least one of the user's teeth the source and detector are on opposites sides of the at least one of the users' teeth.

In an example, the light source and detector are housed in a body such that when the body is placed adjacent to the at least one of the user's teeth the source and detector are on the same side of the at least one of the users' teeth.

As described above, a personalized and automatic solution for teeth whitening is provided. Systems and method have been developed that automatically adjust the light wavelength, and if necessary also the irradiance, incident on the teeth based on the feedback of the absorption of the staining molecules, providing significantly higher whitening efficacy and resultant shade consistency than the current lighting concepts for teeth whitening. This is achieved via a sensor or detector that is used to retrieve data that allows determining information on the absorption of the staining molecules. Based on this information, the light source parameters are determined. Hence, based on the teeth of the user, the teeth whitening procedure is adapted providing for the personalized and automatic tooth whitening solution.

The tooth whitening systems, and method of controlling a tooth whitening system and now described in further detail with respect to specific detailed embodiments, where reference is made to FIGS. 4-16.

Figure 4:
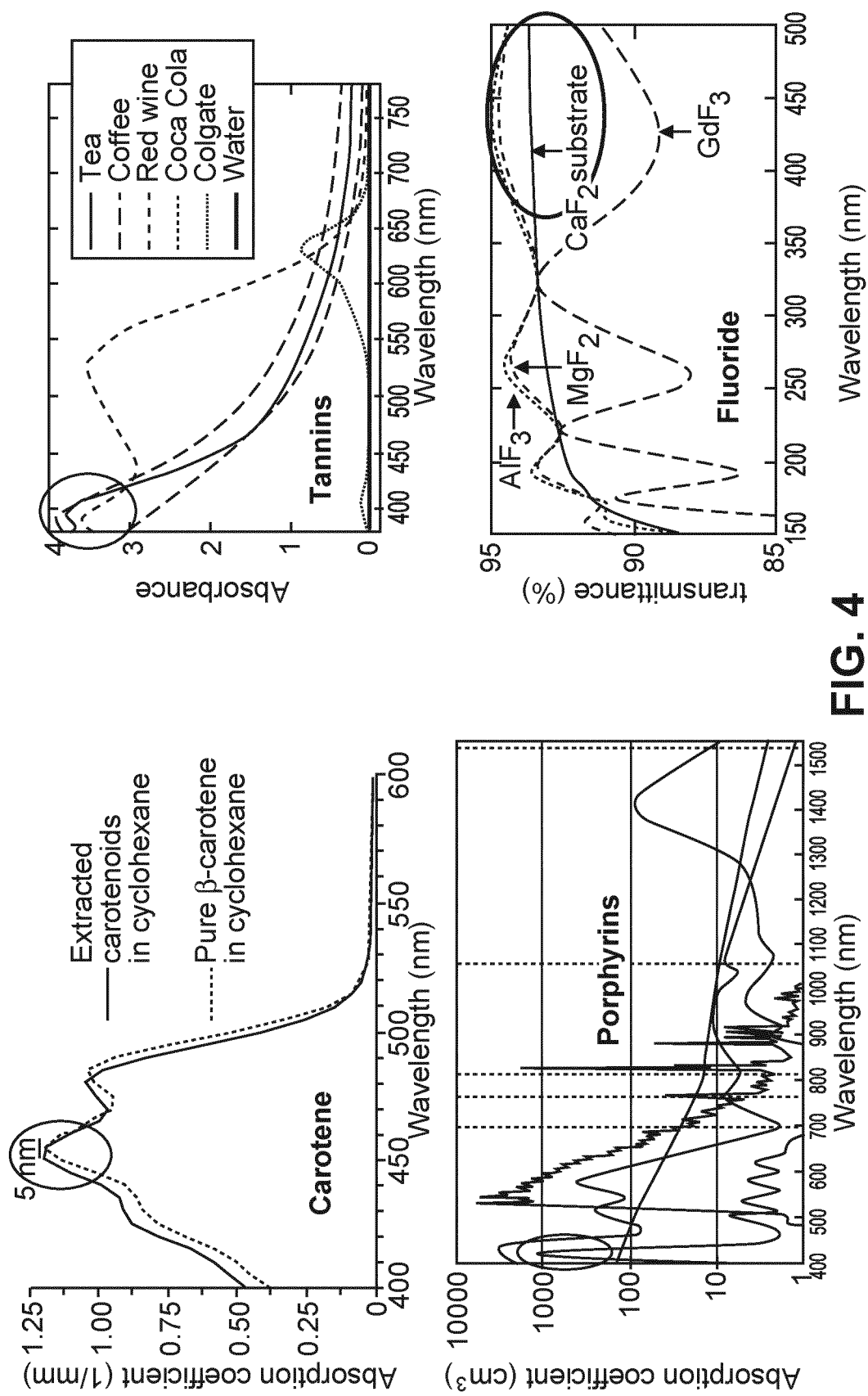
FIG. 4 shows absorption and transmission spectra of common stains found in teeth, including carotene, tannins, porphyrins, and fluoride stains.
Figure 5:
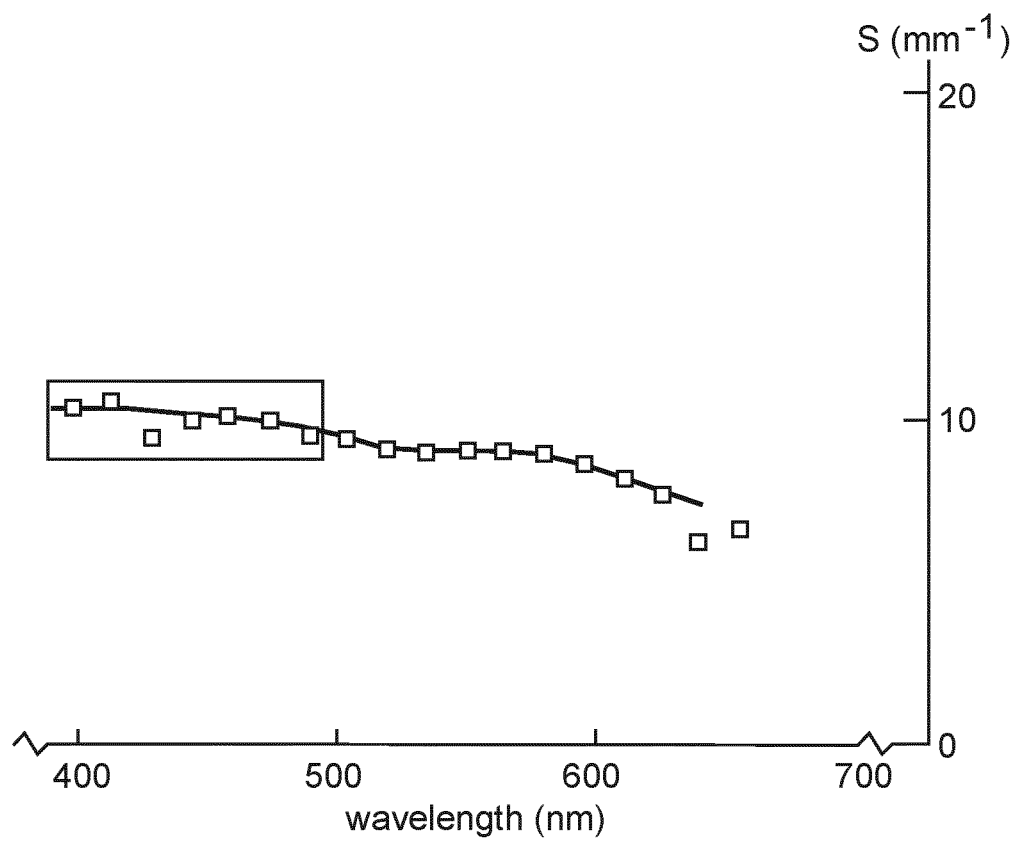
FIG. 5 Typical scattering coefficient of bovine incisors and human premolars.

FIG. 4 shows absorption and transmission spectrum of common stains found in teeth including carotene, tannins (coffee, tea), porphyrins and fluoride stains ($CaF_2$). It is seen that porphyrins and tannins absorb the strongest at ~400 nm while carotene absorption peaks at ~450 nm. It is also observed that the absorption of fluoride stains especially $CaF_2$ is constant between 400-500 nm. Absorption peak wavelengths and corresponding absorption coefficient of the above staining molecules are calculated and summarized in the table below.

| Staining Molecules | Absorption Peak Wavelength (nm) | Absorption Coefficient ($cm^{-1}$) |
|---|---|---|
| Carotene | 455 | 12 |
| Tannins (coffee, tea) | 400 | 9 |
| Porphyrins | 420 | 100 |
| Fluoride stain ($CaF_2$) | 400-500 | 5 |

The inventors realised that this information, that different staining molecules in the teeth absorb at different wavelengths, could be made use of in a new tooth whitening technique rather than causing problems. The inventors realised that if the light wavelength was adjusted to the peak of the absorption spectrum of the staining molecules this would result in the highest absorption efficiency, facilitating the strongest reaction between hydrogen peroxide and the corresponding staining molecules and hence the shortest treatment time. In addition, power consumption of the light source as well as heat mitigation would be minimized if the wavelength was adjusted to the peak absorption of the staining molecules. This realisation led to the development of the new technique described here that automatically adjusts the light wavelength, and if necessary irradiance, incident on the teeth based on the feedback of the absorption of the staining molecules, providing significantly higher whitening efficacy and resultant shade consistency than the current systems. The technique automatically targets the stains most prevalent for a particular user, providing for a truly bespoke and more efficient tooth whitening technique, revolutionary in its simplicity where the actual wavelength of light being used in an operational tooth whitening mode (at a determined peak in absorption) does not need to be known. It was also realised that the new technique was compatible with mouthpiece bodies currently being used.

In essence, the new technique involves identifying, within the blue light range (400-495 nm), what wavelength gives the strongest absorption to a user's teeth and automatically adjusting the wavelength, and if necessary also irradiance, to provide optimized and consistent whitening efficacy. Because the scattering coefficient of teeth is constant across the blue light range (see FIG. 5 that shows typical scattering coefficient of bovine incisors and human premolars, where the spectral dependence is similar for all samples, and the scattering coefficient is considered constant over the 400-495 nm range), the inventors realised that it was feasible to use transmission or diffuse reflectance measurement to derive a measure of absorption of the teeth—in effect determine the absorption coefficient of teeth. The inventors also realised that because the scattering coefficient of teeth is constant and dominant compared to absorption, the penetration depth of light within the blue light range is relatively constant, which enabled a simple solution to be developed that operated over this whole blue light range.

Figure 6:
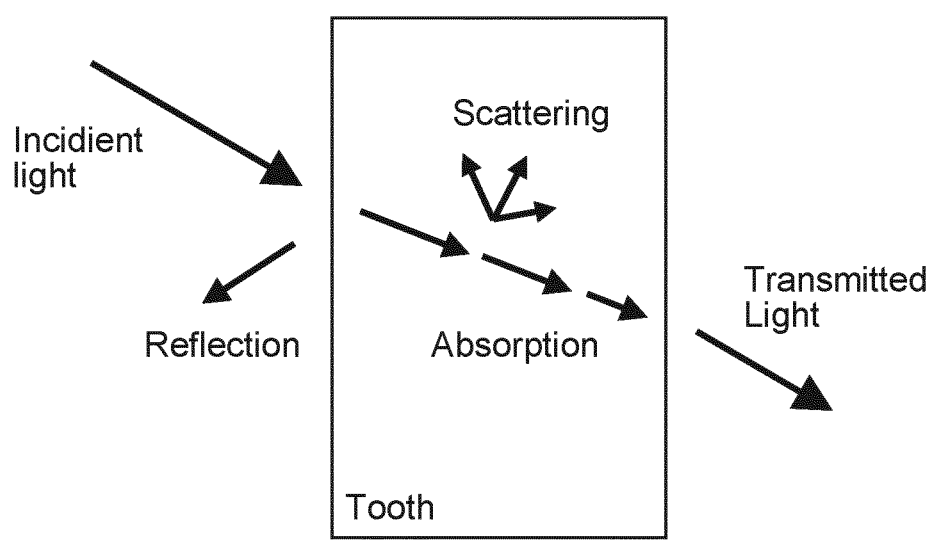
FIG. 6 shows a schematic diagram of a transmission measurement, where the absorption coefficient of teeth can be derived based on the Beer-Lambert law after subtracting the effect from surface reflection and scattering.

For transmission measurement, the new technique is shown schematically in FIG. 6. Based on the Beer-Lambert law (Eq. 1), the attenuation coefficient and hence the absorption coefficient can be derived.

$$I(\lambda) = I_0(\lambda) e^{-\mu_t(\lambda)x} \quad (\text{Eq. 1})$$

where $I(\lambda)$ is transmitted light, $I_0(\lambda)$ is the incident light, $\mu_t = \mu'_s + \mu_\alpha$ is the attenuation coefficient, $\mu'_s$ is the known reduced scattering coefficient, $\mu_\alpha$ is the unknown absorption coefficient, x is the known thickness of the teeth. Thus, the absorption coefficient of teeth can be derived based on the Beer-Lambert law after subtracting the effect from surface reflection and scattering.

Figure 7:
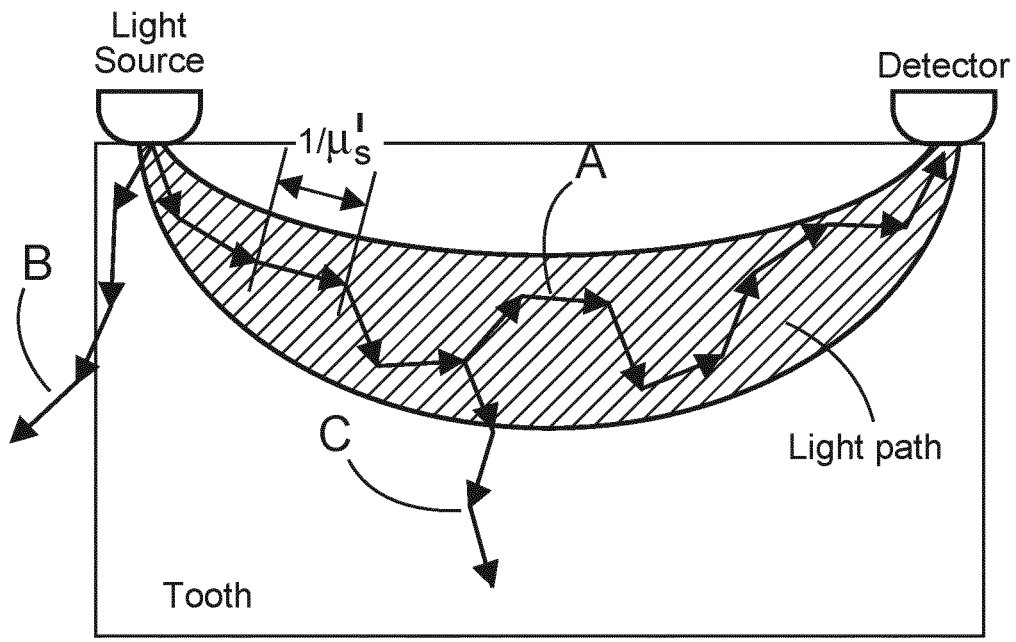
FIG. 7 shows a schematic diagram of a diffuse reflectance measurement, where a ratio of the absorption coefficient of teeth at different wavelengths can be derived based on the Kubelka-Munk (K-M) model.

For diffuse reflectance measurement, the concept is shown in FIG. 7, where radiation entering the tooth can be diffused away from the detector—as shown at "B" and "C", but where some radiation can be diffusely reflected along a path to the detector—shown at "A". Based on the Kubelka-Munk (K-M) model, the absorption coefficient can be derived from measured diffuse reflectance and known scattering coefficient (Eq. 2).

$$\frac{\mu_a}{\mu_s} = \frac{(1-R_\infty)^2}{2R_\infty} \quad (\text{Eq. 2})$$

where $R_\infty$ is the detected diffuse reflectance, $\mu_s$ is the known constant scattering coefficient in the blue wavelength range, and $\mu_\alpha$ is the unknown absorption coefficient. Thus, the ratio of the absorption coefficient of teeth at different wavelengths can be derived.

In specific embodiments, one or other or indeed both of the following two approaches can be taken to achieve the goal of higher teeth whitening efficacy and consistency:

(a) Adjust wavelength (while keeping irradiance constant) to maximum absorption (i.e., the measured absorption coefficient is at maximum). Either transmission or diffuse reflectance measurement can be utilized. When the wavelength is adjusted to the optimum (i.e., the peak absorption wavelength of teeth stains), shortest treatment time or minimum power consumption/heat mitigation can be achieved. For shortest treatment time purposes, the light source can be operated in continuous mode. For minimum power consumption/heat mitigation purposes, the light source can be operated in pulsed mode.

EXAMPLE

Input light power is at constant $I_0$, wavelength is tuneable from 400 nm to 495 nm.

i) For transmission measurement: Assume that at wavelength $\lambda_x$ (400≤x≤495), detected transmitted light power is at minimum ($I_{min}$), then wavelength $\lambda_x$ is determined to be the optimal wavelength to maximize absorption using Equation 1 based on the fact that teeth scattering coefficient between 400-495 nm is constant.

ii) For diffuse reflectance measurement: Assume that at wavelength $\lambda_x$ (400≤x≤495), calculated ratio of teeth absorption coefficient to teeth scattering coefficient ($\mu_a/\mu_s$) is at maximum based on measured diffuse reflection ($R_\infty$) using Equation 2, then wavelength $\lambda_x$ is determined to be the optimal wavelength to maximize absorption based on the fact that teeth scattering coefficient between 400-495 nm is constant.

(b) Adjust irradiance (while keeping wavelength constant) to ensure absorbed light power is equivalent to that of a calibration tooth at the most common shade (e.g., 12.5). Either transmission or diffuse reflectance measurement can be utilized. When the attenuated light power is equivalent to that of a calibration tooth, the absorbed light power is also equivalent to that of a calibration tooth based on the fact that teeth scattering coefficient between 400-495 nm is constant.

(c) Combine (a) and (b) and adjust wavelength and irradiance.

EXAMPLE

Wavelength of the light source is constant at 460 nm, input light power tuneable at $I_{0x}$, total attenuated light power from a calibration tooth is at constant $I_{t0}$.

i) For transmission measurement: Assume that at input light power at $I_{0x}$, detected total attenuated light power $I_{tx} = I_{0x} - I_x$ equals to $I_{t0}$ where $I_x$ is the detected transmitted light power, then input light power $I_{0x}$ is determined to be optimal to provide equivalent absorbed light power to that of a calibration tooth based on the fact that teeth scattering coefficient between 400-495 nm is constant.

ii) For diffuse reflectance measurement: Assume that at input light power at $I_{0x}$, calculated teeth absorption coefficient is $\mu_a$ based on known teeth scattering coefficient ($\mu_s$) and measured diffuse reflection ($R_\infty$) using Equation 2. When total attenuated light power $I_{tx} = I_{0x} - I_{0x} e^{-\mu_t x}$ equals to $I_{t0}$ where $\mu_t = \mu_s + \mu_a$, then input light power $I_{0x}$ is determined to be optimal to provide equivalent absorbed light power to that of a calibration tooth based on the fact that teeth scattering coefficient between 400-495 nm is constant.

Regarding approach (a) described above, four specific embodiments will now be described.

Figure 8:
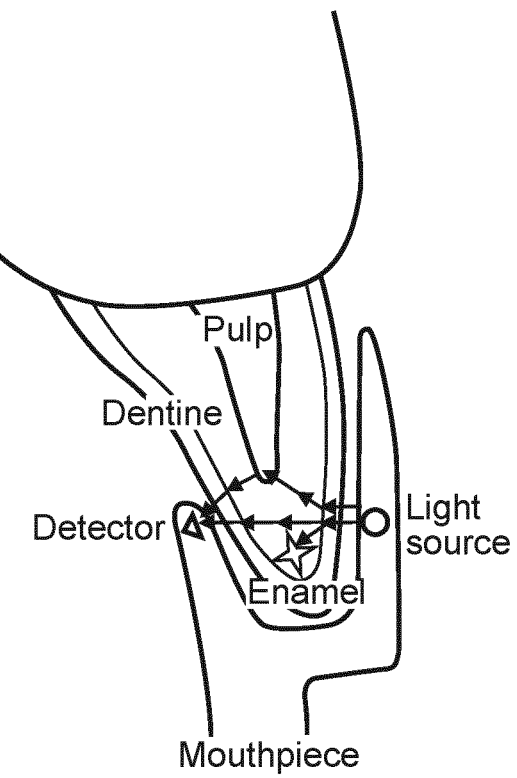
FIG. 8 shows a schematic set up of an example of a tooth whitening system.
Figure 9:
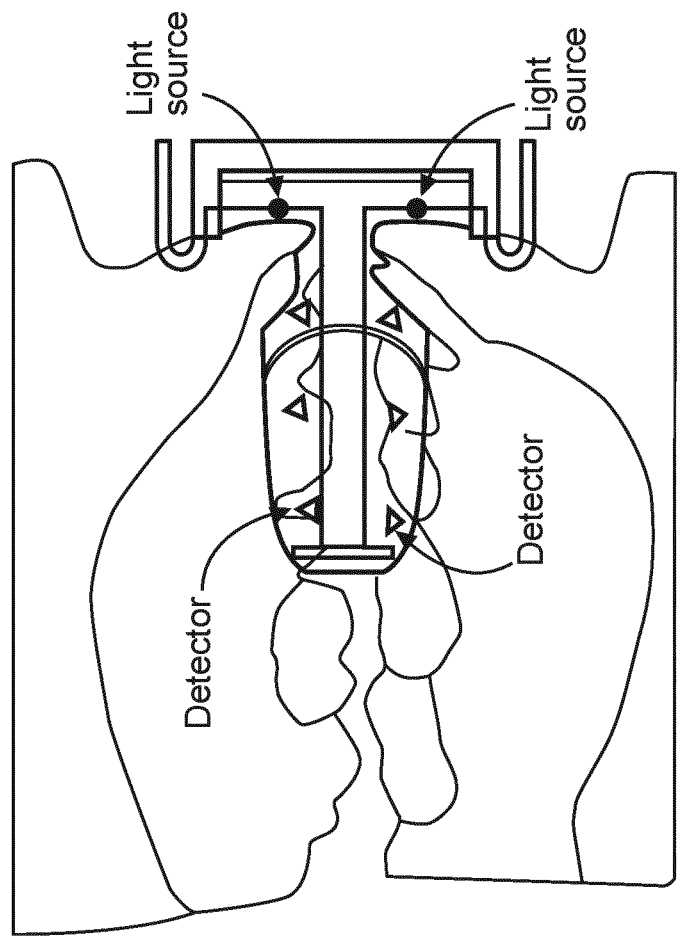
FIG. 9 shows a layout of an example of a tooth whitening system.
Figure 9:
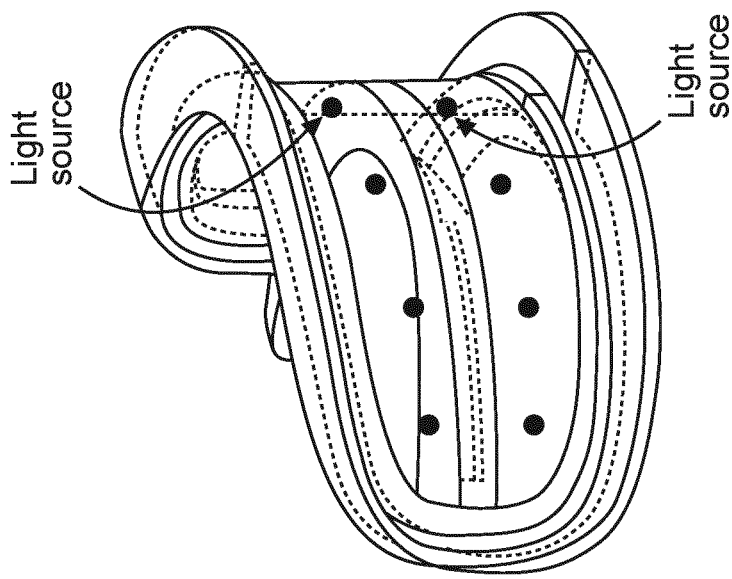

Approach (a) Embodiment 1: This utilizes a transmission measurement, where the light source and detector are within the body or mouthpiece such that when the body/mouthpiece is placed around the teeth the light source is on the buccal side, and the detector in on the lingual side. This is shown in FIGS. 8-9, where FIG. 8 shows a schematic diagram of the mechanism of Embodiment 1, whilst FIG. 9 shows the layout of Embodiment 1. As shown in FIG. 8 light is transmitted from the buccal side to the lingual side of the teeth, and in doing so interacts with the enamel, dentine and even pulp of the tooth. Hydrogen peroxide with the light absorption at an absorption peak of a stain molecule facilitates and increases the reaction between the hydrogen peroxide and the staining molecules leading to an increased effectiveness of stain removal.

The body or mouthpiece is shown at FIG. 9, and one or multiple light source(s) (e.g., LED, laser) with adjustable wavelengths and corresponding detector(s) can be mounted at different locations on the mouth piece/body. The detector or detectors (e.g. photodiode(s), thermal power sensor(s), pyroelectric sensor(s)) can be calibrated to have a flat response in the blue light range. If only one light source/detector pair is utilized, such pair can be mounted at one of the front teeth to serve as a sensor for wavelength optimization purpose. Additional light source(s) and waveguide can be utilized to provide illumination at selected optimized wavelength from buccal side. If multiple light sources with adjustable wavelengths and corresponding detectors are utilized, each light source/detector pair serves two roles: both a sensor for wavelength optimization purpose and illumination provider (light source to provide appropriate irradiance on the teeth). Dimension and gaps of the light source can be optimized (according to the light source(s) utilized) to provide customized illumination on teeth surface. The positions of the light sources and detectors can be fixed, and the distances between a light source and its paired detector known.

Illumination optimization can be achieved by adjusting the wavelength to the absorption peak of the teeth in the blue wavelength range (400-495 nm) using the light source/detector pair(s). FIG. 6 shows the schematic diagram of the mechanism of Embodiment 1. FIG. 7 shows the layout of Embodiment 1.

Figure 10:
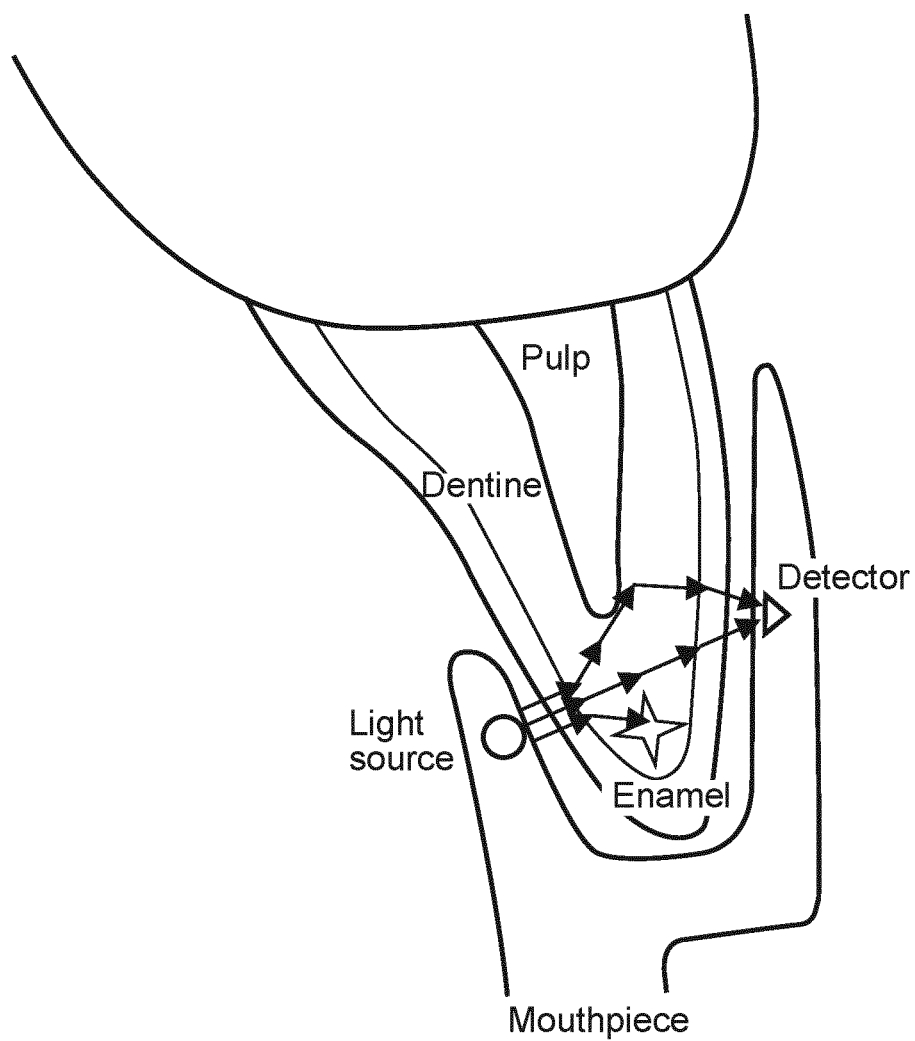
FIG. 10 shows a schematic set up of an example of a tooth whitening system.

Approach (a) embodiment 2: This utilizes a transmission measurement, where the light source and detector are within the body or mouthpiece such that when the body/mouthpiece is placed around the teeth the light source is on the lingual side, and the detector in on the buccal side. FIG. 10 shows a schematic diagram of the mechanism of Embodiment 2, whilst the layout is similar to that shown in FIG. 9 except that the positions of the light sources and detectors are reversed. As shown in FIG. 10 light is transmitted from the lingual side to the buccal side of the teeth, and in doing so interacts with the enamel, dentine and even pulp of the tooth. Hydrogen peroxide with the light absorption at an absorption peak of a stain molecule facilitates and increases the reaction between the hydrogen peroxide and the staining molecules leading to an increased effectiveness of stain removal. Again, one or multiple light source(s) (e.g., LED, laser) with adjustable wavelengths and corresponding detector(s) can be mounted at different locations on the mouth piece/body to serve as a sensor for wavelength optimization purpose. Additional light source(s) with adjustable wavelength and waveguide can be utilized to provide illumination at selected optimized wavelength from buccal side. Illumination optimization can be achieved by adjusting the wavelength to the absorption peak of the teeth in the blue wavelength range (400-495 nm) using the light source/detector pair(s). Again the detector(s) (e.g. photodiode(s)) can be calibrated to have a flat response in the blue light range, and the positions of the light sources and detectors can be fixed, and the distances between a light source and its paired detector known. It is to be noted in this embodiment that the additional light source(s) on the buccal side of the teeth may be needed to achieve whitening of the front surface of the teeth.

Figure 11:
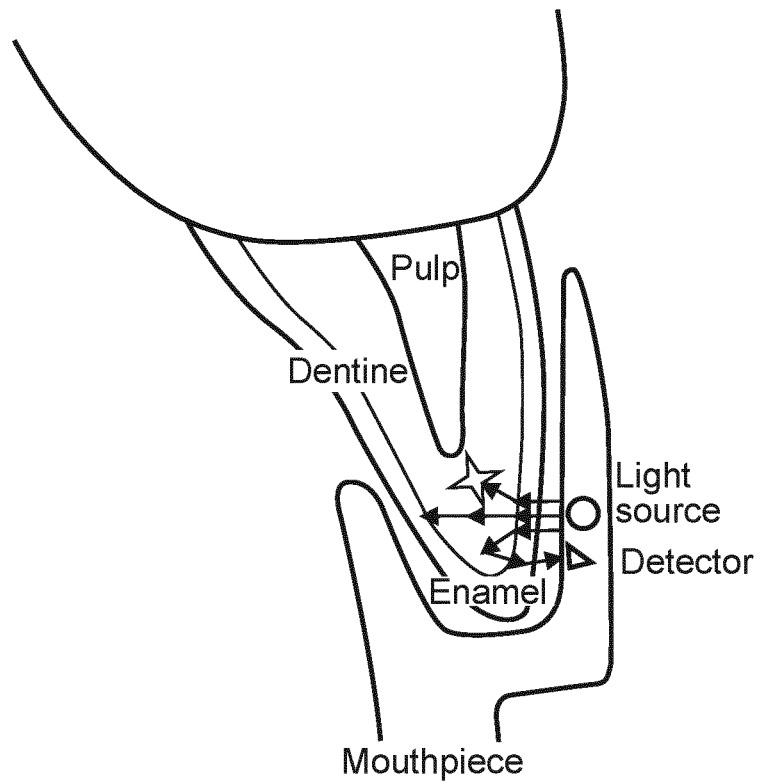
FIG. 11 shows a schematic set up of an example of a tooth whitening system.

Approach (a) embodiment 3: This utilizes a diffuse reflectance measurement, where the light source and detector are within the body or mouthpiece such that when the body/mouthpiece is placed around the teeth both the light source and the detector are on the buccal side. FIG. 11 shows a schematic diagram of the mechanism of Embodiment 3, whilst it will be clear looking at the layout shown in FIG. 9 that the mouthpiece/body now has the detector and light source located on the outside or buccal side of the teeth. As shown in FIG. 11 light enters the buccal side and is diffusely reflected back to the detector on the buccal side, and in doing so interacts with the enamel, dentine and even pulp of the tooth. Hydrogen peroxide with the light absorption at an absorption peak of a stain molecule again facilitates and increases the reaction between the hydrogen peroxide and the staining molecules leading to an increased effectiveness of stain removal. Again, one or multiple light source(s) (e.g., LED, laser) with adjustable wavelengths and corresponding detector(s) can be mounted at different locations on the mouth piece/body. One or multiple light source(s) (e.g., LED, laser) with adjustable wavelengths can be mounted at different locations on the mouth piece/body to serve as a sensor for wavelength optimization purpose. If only one light source/detector pair is utilized, such pair can be mounted at one of the front teeth to serve as a sensor for wavelength optimization purpose. Additional light source(s) and waveguide can be utilized to provide illumination at selected optimized wavelength from the buccal side. If multiple light sources with adjustable wavelengths and corresponding detectors are utilized, each light source/detector pair serves two roles: both a sensor for wavelength optimization purpose and illumination provider (light source to provide appropriate irradiance on the teeth). Dimension and gaps of the light source can be optimized (according to the light source(s) utilized) to provide customized illumination on teeth surface. Illumination optimization can be achieved by adjusting the wavelength to the absorption peak of the teeth in the blue wavelength range (400-495 nm) using the light source/detector pair(s). Again, the detector(s) (e.g. photodiode(s)) can be calibrated to have a flat response in the blue light range, and the positions of the light sources and detectors can be fixed, and the distances between a light source and its paired detector known.

Figure 12:
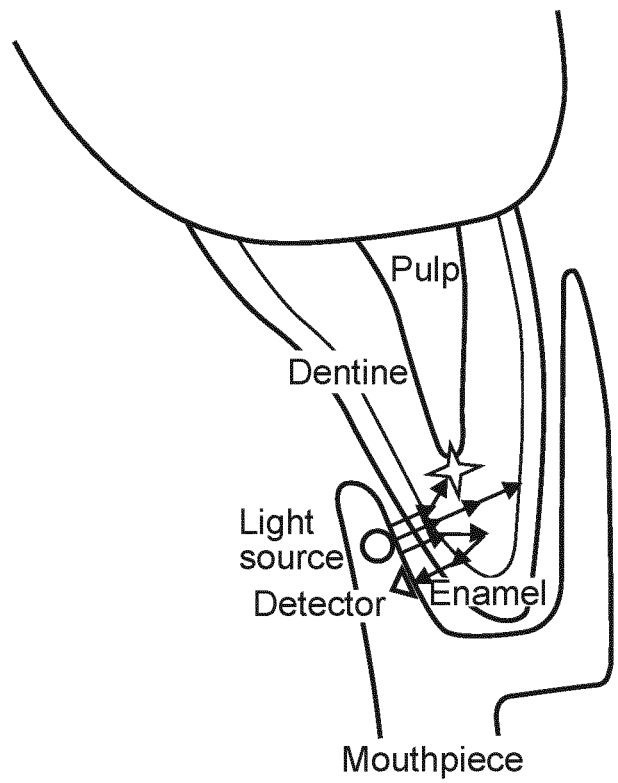
FIG. 12 shows a schematic set up of an example of a tooth whitening system.

Approach (a) embodiment 4: This utilizes a diffuse reflectance measurement, where the light source and detector are within the body or mouthpiece such that when the body/mouthpiece is placed around the teeth both the light source and the detector are on the lingual side. FIG. 12 shows a schematic diagram of the mechanism of Embodiment 4, whilst it will be clear looking at the layout shown in FIG. 9 that the mouthpiece/body now has the detector and light source located on the inside or lingual side of the teeth. As shown in FIG. 12 light enters the lingual side and is diffusely reflected back to the detector on the lingual side, and in doing so interacts with the enamel, dentine and even pulp of the tooth. Hydrogen peroxide with the light absorption at an absorption peak of a stain molecule again facilitates and increases the reaction between the hydrogen peroxide and the staining molecules leading to an increased effectiveness of stain removal. One or multiple light source(s) (e.g., LED, laser) with adjustable wavelengths can be mounted at different locations on the mouth piece/body to serve as a sensor for wavelength optimization purpose. If only one light source/detector pair is utilized, such pair can be mounted at one of the front teeth to serve as a sensor for wavelength optimization purpose. Additional light source(s) and waveguide can be utilized to provide illumination at selected optimized wavelength from the buccal side. If multiple light sources with adjustable wavelengths and corresponding detectors are utilized, each light source/detector pair serves two roles: both a sensor for wavelength optimization purpose and illumination provider (light source to provide appropriate irradiance on the teeth). Dimension and gaps of the light source can be optimized (according to the light source(s) utilized) to provide customized illumination on teeth surface. Illumination optimization can be achieved by adjusting the wavelength to the absorption peak of the teeth in the blue wavelength range (400-495 nm) using the light source/detector pair(s). Again, the detector(s) (e.g. photo-diode(s)) can be calibrated to have a flat response in the blue light range, and the positions of the light sources and detectors can be fixed, and the distances between a light source and its paired detector known.

Regarding approach (b) described above, four specific embodiments will now be described.

Figure 13:
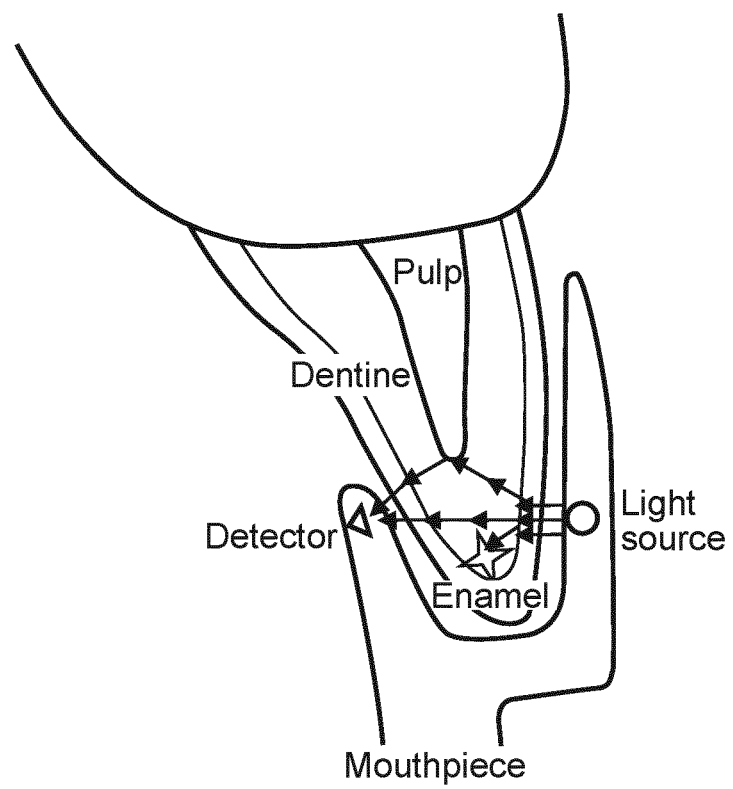
FIG. 13 shows a schematic set up of an example of a tooth whitening system.

Approach (b) embodiment 1: This utilizes a transmission measurement, where the light source and detector are within the body or mouthpiece such that when the body/mouthpiece is placed around the teeth the light source is on the buccal side, and the detector in on the lingual side. FIG. 13 shows a schematic diagram of the mechanism of Embodiment 1, whilst the layout is similar to that shown in FIG. 8. As shown in FIG. 13 light is transmitted from the buccal side to the lingual side of the teeth, and in doing so interacts with the enamel, dentine and even pulp of the tooth. Hydrogen peroxide with the light absorption at an absorption peak of a stain molecule facilitates and increases the reaction between the hydrogen peroxide and the staining molecules leading to an increased effectiveness of stain removal. One or multiple light source(s) (e.g., LED, laser) at fixed wavelengths (e.g., 405/420/440/460 nm) with adjustable irradiance on the teeth (by adjusting the power of the light source) and corresponding detector(s) can be mounted at different locations on the mouth piece/body. If only one light source/detector pair is utilized, such pair can be mounted at one of the front teeth to serve as a sensor for irradiance optimization purpose. Additional light source(s) and waveguide can be utilized to provide illumination at selected optimized irradiance from the buccal side. If multiple light sources with adjustable irradiance and corresponding detectors are utilized, each light source/detector pair serves two roles: both a sensor for irradiance optimization purpose and illumination provider (light source to provide appropriate irradiance on the teeth). Dimension and gaps of the light source can be optimized (according to the light source(s) utilized) to provide customized illumination on teeth surface. Illumination optimization can be achieved by adjusting the irradiance on the teeth so that the absorbed light power is equivalent to a calibration tooth at the most common shade (e.g., 12.5).

Figure 14:
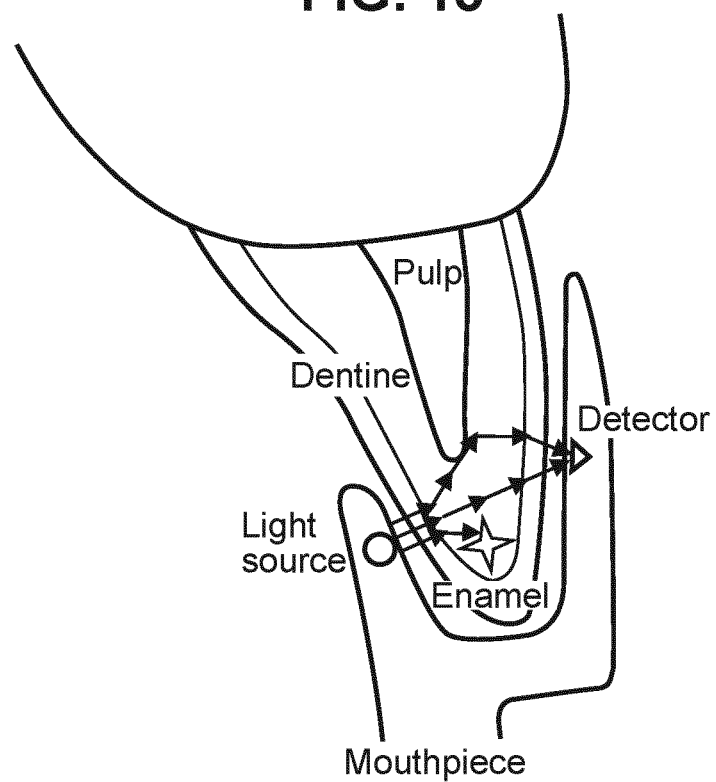
FIG. 14 shows a schematic set up of an example of a tooth whitening system.

Approach (b) embodiment 2: Transmission measurement, where the light source and detector are within the body or mouthpiece such that when the body/mouthpiece is placed around the teeth the light source is on the lingual side, and the detector in on the buccal side. FIG. 14 shows a schematic diagram of the mechanism of Embodiment 1, whilst the layout is similar to that described with respect to FIG. 13 except that the positions of the light source and detector are reversed. As shown in FIG. 14 light is transmitted from the lingual side to the buccal side of the teeth, and in doing so interacts with the enamel, dentine and even pulp of the tooth. Hydrogen peroxide with the light absorption at an absorption peak of a stain molecule facilitates and increases the reaction between the hydrogen peroxide and the staining molecules leading to an increased effectiveness of stain removal. One or multiple light source(s) (e.g., LED, laser) at fixed wavelengths (e.g., 405/420/440/460 nm) with adjustable irradiance on the teeth (by adjusting the power of the light source) and corresponding detector(s) can be mounted at different locations on the mouth piece/body. If only one light source/detector pair is utilized, such pair can be mounted at one of the front teeth to serve as a sensor for irradiance optimization purpose. Additional light source(s) and waveguide can be utilized to provide illumination at selected optimized irradiance from the buccal side. If multiple light sources with adjustable irradiance and corresponding detectors are utilized, each light source/detector pair serves two roles: both a sensor for irradiance optimization purpose and illumination provider (light source to provide appropriate irradiance on the teeth). Dimension and gaps of the light source can be optimized (according to the light source(s) utilized) to provide customized illumination on teeth surface. Illumination optimization can be achieved by adjusting the irradiance on the teeth so that the absorbed light power is equivalent to a calibration tooth at the most common shade (e.g., 12.5). It is to be noted in this embodiment that the additional light source(s) on the buccal side of the teeth may be needed to achieve whitening of the front surface of the teeth.

Figure 15:
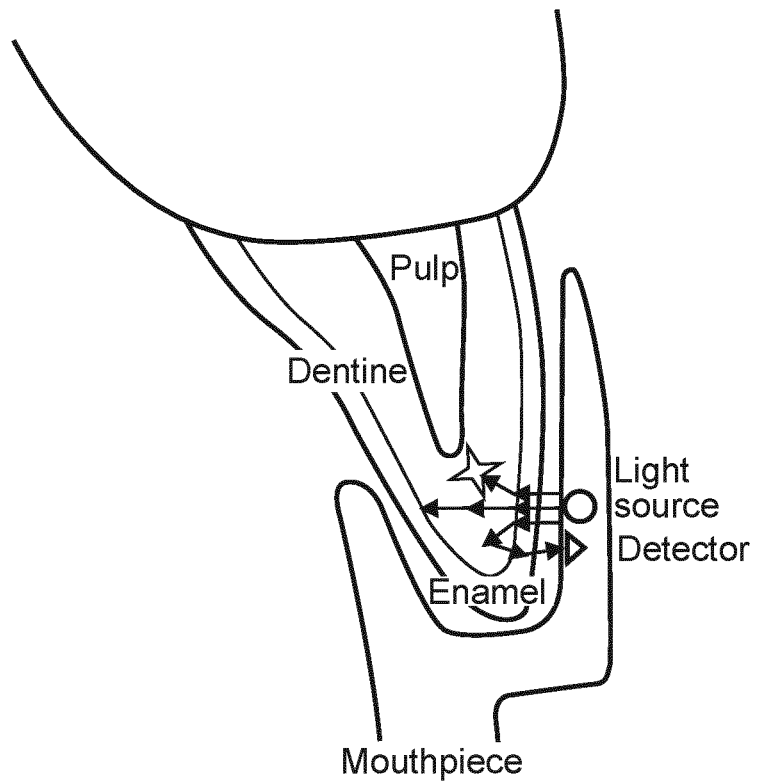
FIG. 15 shows a schematic set up of an example of a tooth whitening system.

Approach (b) embodiment 3: This utilizes a diffuse reflectance measurement, where the light source and detector are within the body or mouthpiece such that when the body/mouthpiece is placed around the teeth both the light source and the detector are on the buccal side. FIG. 15 shows a schematic diagram of the mechanism of Embodiment 3, whilst it will be clear from the discussion above that the mouthpiece/body now has the detector and light source located on the outside or buccal side of the teeth. As shown in FIG. 15 light enters the buccal side and is diffusely reflected back to the detector on the buccal side, and in doing so interacts with the enamel, dentine and even pulp of the tooth. Hydrogen peroxide with the light absorption at an absorption peak of a stain molecule again facilitates and increases the reaction between the hydrogen peroxide and the staining molecules leading to an increased effectiveness of stain removal. One or multiple light source(s) (e.g., LED, laser) at fixed wavelengths (e.g., 405/420/440/460 nm) with adjustable irradiance on the teeth (by adjusting the power of the light source) and corresponding detector(s) can be mounted at different locations on the mouth piece. If only one light source/detector pair is utilized, such pair can be mounted at one of the front teeth to serve as a sensor for irradiance optimization purpose. Additional light source(s) and waveguide can be utilized to provide illumination at selected optimized irradiance from the buccal side. If multiple light sources with adjustable irradiance and corresponding detectors are utilized, each light source/detector pair serves two roles: both a sensor for irradiance optimization purpose and illumination provider (light source to provide appropriate irradiance on the teeth). Dimension and gaps of the light source can be optimized (according to the light source(s) utilized) to provide customized illumination on teeth surface. Illumination optimization can be achieved by adjusting the irradiance on the teeth so that the absorbed light power is equivalent to a calibration tooth at the most common shade (e.g., 12.5).

Figure 16:
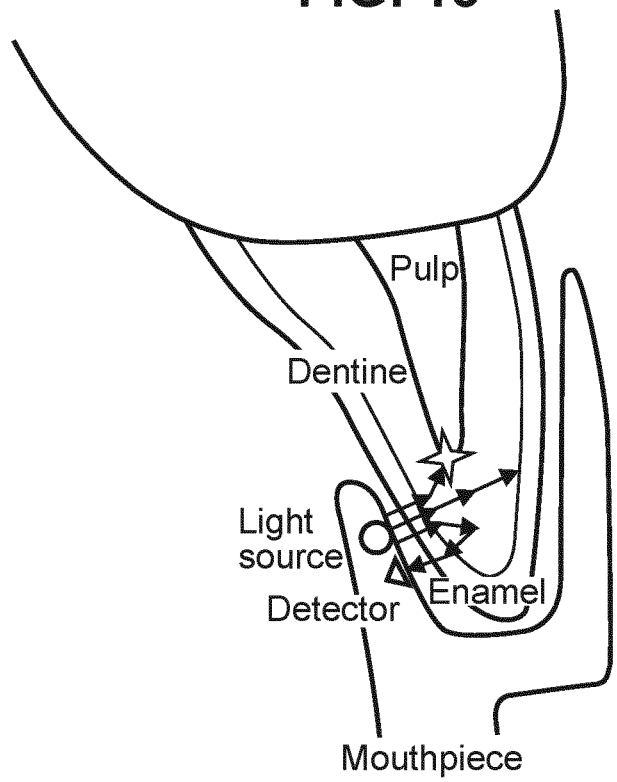
FIG. 16 shows a schematic set up of an example of a tooth whitening system.

Approach (b) embodiment 4: This utilizes a diffuse reflectance measurement, where the light source and detector are within the body or mouthpiece such that when the body/mouthpiece is placed around the teeth both the light source and the detector are on the lingual side. FIG. 16 shows a schematic diagram of the mechanism of Embodiment 4, whilst it will be clear from the discussion above that the mouthpiece/body now has the detector and light source located on the inside or lingual side of the teeth. As shown in FIG. 16 light enters the lingual side and is diffusely reflected back to the detector on the lingual side, and in doing so interacts with the enamel, dentine and even pulp of the tooth. Hydrogen peroxide with the light absorption at an absorption peak of a stain molecule again facilitates and increases the reaction between the hydrogen peroxide and the staining molecules leading to an increased effectiveness of stain removal. One or multiple light source(s) (e.g., LED, laser) at fixed wavelengths (e.g., 405/420/440/460 nm) with adjustable irradiance on the teeth (by adjusting the power of the light source) and corresponding detector(s) can be mounted at different locations on the mouth piece. If only one light source/detector pair is utilized, such pair can be mounted at one of the front teeth to serve as a sensor for irradiance optimization purpose. Additional light source(s) and waveguide can be utilized to provide illumination at selected optimized irradiance from the buccal side. If multiple light sources with adjustable irradiance and corresponding detectors are utilized, each light source/detector pair serves two roles: both a sensor for irradiance optimization purpose and illumination provider (light source to provide appropriate irradiance on the teeth). Dimension and gaps of the light source can be optimized (according to the light source(s) utilized) to provide customized illumination on teeth surface. Illumination optimization can be achieved by adjusting the irradiance on the teeth so that the absorbed light power is equivalent to a calibration tooth at the most common shade (e.g., 12.5).

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. A tooth whitening system, comprising:
a light source;
a light detector; and
a processing unit;
wherein the light source and detector are housed in a body, and the body is configured to be placed adjacent to at least one of a user's teeth;

wherein, the light source is configured such that a wavelength of the light emitted is adjustable over a wavelength range of operation;

wherein, the detector is configured to detect light emitted from the light source that is transmitted and/or reflected and/or scattered from the at least one of the user's teeth;

wherein, the processing unit is configured to:
control the light source to adjust the wavelength of the light emitted by the light source, and
determine a measure of absorption for different wavelengths on the basis of the detected light for the different wavelengths; and wherein, the processing unit is configured to utilize the determined measure of absorption to operate the light source at a wavelength at a peak in absorption.

2. Tooth whitening system according to claim 1, wherein the processing unit is configured to control the light source to adjust the wavelength of the light emitted by the light source over the wavelength range of operation of at least 400-495 nm.

3. Tooth whitening system according to claim 1, wherein the system comprises further at least one light source, and wherein the processing unit is configured to operate the further at least one light source at the wavelength at the peak in absorption on the basis of the measures of absorption.

4. Tooth whitening system according to claim 3, wherein the processing unit is configured to operate at a wavelength scan position associated with a maximum in determined measure of absorption.

5. Tooth whitening system according to claim 1, wherein the processing unit is configured to operate at the wavelength at the peak in absorption comprising a comparison of the measures of absorption for the different wavelengths of the light emitted by the light source with one or more known absorption profiles of stain molecules.

6. Tooth whitening system according to claim 1, wherein the light source is configured to operate over a range of light emission power, and wherein the processing unit is configured to control the light source to operate at an operational light power on the basis of the determined measure of absorption.

7. Tooth whitening system according to claim 6, wherein the processing unit is configured to control the light source to operate at the operational light power such that an intensity of light absorbed equals a required absorption intensity.

8. Tooth whitening system according to claim 1, wherein the light source and detector are housed in the body such that when the body is placed adjacent to at least one of the user's teeth the source and detector are on opposites sides of the at least one of the users' teeth.

9. Tooth whitening system according to claim 1, wherein the light source and detector are housed in the body such that when the body is placed adjacent to at least one of the user's teeth the source and detector are on the same side of the at least one of the users' teeth.

10. A tooth whitening system, comprising:
a plurality of light sources;
a plurality of light detectors; and
a processing unit;
wherein each light source is paired with a detector;
wherein the plurality of light sources and the plurality of detectors are housed in a body that is configured to be placed adjacent to a plurality of the user's teeh;
wherein, each light source is configured such that a wavelength of the light emitted is adjustable over a wavelength range of operation;

wherein, each detector is configured to detect light emitted from the paired light source that is transmitted and/or reflected and/or scattered from the at least one of the user's teeth;

wherein, for each light source and detector pair the processing unit is configured to control each light source to adjust the wavelength of the light emitted by the light source and is configured to determine a measure of absorption for different wavelengths on the basis of the detected light for the different wavelengths; and wherein, for each light source and detector pair the processing unit is configured to utilize the determined measure of absorption to operate the light source of each light source and detector pair at a wavelength at a peak in absorption.

11. Tooth whitening system according to claim 10, wherein the processing unit is configured to control each light source to operate at a wavelength independent of the operational wavelength of any of the other light sources.

12. A method of controlling a tooth whitening device, the tooth whitening system comprising a light source, a light detector, and a processing unit, wherein the light source and detector are housed in a body and the body is configured to be placed adjacent to at least one of a user's teeth, wherein the light source is configured such that a ad to a wavelength of the light emitted is adjustable over a wavelength range of operation, wherein the detector is configured to detect light emitted from the light source that is transmitted and/or reflected and/or scattered from the at least one of the user's teeth, and wherein the method comprises:

a) controlling by the processing unit the light source to adjust the wavelength of the light emitted by the light source;

b) determining by the processing unit a measure of absorption for different wavelengths on the basis of the detected light for the different wavelengths; and c) utilizing by the processing unit the determined measure of absorption to operate the light source at a peak in absorption.

13. Method according to claim 12, wherein the system comprises further at least one light source, and the method comprises controlling by the processing unit the further at least one light source to operate at the wavelength at the peak in absorption on the basis of the measures of absorption.

14. Method according to claim 13, comprising operating by the processing unit at a wavelength scan position associated with a maximum in determined measure of absorption.

15. A computer program element for controlling a system according to claim 1, which when executed by the processing unit is configured to:

a) control the light source to adjust the wavelength of the light emitted by the light source;

b) determine a measure of absorption for different wavelengths on the basis of the detected light for the different wavelengths; and c) operate the light source at a peak in absorption.

16. A computer program element for controlling a system according to claim 10 which when executed by the processing unit is configured to:

a) control the light source to adjust the wavelength of the light emitted by the light source;

b) determine a measure of absorption for different wavelengths on the basis of the detected light for the different wavelengths; and
c) operate the light source at a peak in absorption.

* * * * *